US012592330B2

(12) United States Patent
Koda

(10) Patent No.: US 12,592,330 B2
(45) Date of Patent: Mar. 31, 2026

(54) R-T-B BASED PERMANENT MAGNET

(71) Applicant: TDK CORPORATION, Tokyo (JP)

(72) Inventor: Atsushi Koda, Tokyo (JP)

(73) Assignee: TDK Corporation, Tokyo (JP)

( * ) Notice: Subject to any disclaimer, the term of this patent is extended or adjusted under 35 U.S.C. 154(b) by 219 days.

(21) Appl. No.: 18/394,227

(22) Filed: Dec. 22, 2023

(65) Prior Publication Data

US 2024/0212896 A1 Jun. 27, 2024

(30) Foreign Application Priority Data

Dec. 26, 2022 (JP) ................................. 2022-208847

(51) Int. Cl.
*H01F 1/057* (2006.01)
*H01F 7/02* (2006.01)

(52) U.S. Cl.
CPC ............. *H01F 1/0577* (2013.01); *H01F 7/02* (2013.01)

(58) Field of Classification Search
None
See application file for complete search history.

(56) References Cited

U.S. PATENT DOCUMENTS

2013/0026870 A1* 1/2013 Baba ..................... C22C 38/005 427/127
2014/0132377 A1* 5/2014 Nakajima ................. B22F 3/16 420/83
2014/0290803 A1 10/2014 Kato et al.
2018/0158583 A1 6/2018 Masusawa et al.

FOREIGN PATENT DOCUMENTS

JP 2012-023190 A 2/2012
JP 2014-209546 A 11/2014
JP 2021-155782 A 10/2021
WO 2016/121790 A1 8/2016
WO 2021/218698 A1 11/2021
WO 2021/218701 A1 11/2021

OTHER PUBLICATIONS

May 29, 2024 Search Report issued in European Patent Application No. 23219884.6.

* cited by examiner

*Primary Examiner* — Bernard Rojas
(74) *Attorney, Agent, or Firm* — Oliff PLC

(57) ABSTRACT

An R-T-B based permanent magnet includes rare earth elements, transition metal elements, boron, and M. An amount of boron is within a range between 0.90 mass % or more and 1.00 mass % or less. An amount of carbon is within a range between 0 mass % or more and 0.10 mass % or less, an amount of oxygen is within a range between 0 mass % or more and 0.15 mass % or less, an amount of nitrogen is within a range between 0 mass % or more and 0.15 mass % or less, an amount of M is within a range between 0.30 mass % or more and 1.50 mass % or less, an amount of the rare earth elements based on mass represented by TRE is within a range between 29.00 mass % or more and 31.00 mass % or less, and a value represented by Pr/TRE is within a range between 0.30 or larger and 0.50 or smaller.

19 Claims, No Drawings

R-T-B BASED PERMANENT MAGNET

BACKGROUND

The present disclosure relates to an R-T-B based permanent magnet.

Patent Document 1 discloses a technology relating to a method for producing an R-T-B based sintered magnet. Particularly, Patent Document 1 discloses a method for diffusing a heavy rare earth element RH in the R-T-B based sintered magnet material.

Patent Document 2 discloses a technology relating to a rare earth magnet. Particularly, Patent Document 2 discloses a rare earth magnet including a phase in which a two-grain boundary phase has different magnetism from ferromagnetic material such as an $R_6T_{13}M$ phase.

Patent Document 3 discloses a technology relating to a method for producing an anisotropic rare earth magnet. Particularly, Patent Document 3 discloses the production method of sintering a quenched ribbon of amorphous structure, then crystallizing by heating while hot working to make the magnet anisotropic.

Patent Document 4 discloses a technology relating to a method for producing an R-T-B based sintered magnet. Particularly, Patent Document 4 discloses a method for producing a magnet in which an amount of Pr is 75 mass % or more to the entire R, and a length of sintering time is extended in accordance with a proportion of Pr to R. The magnet obtained using said production method attains high Br at low temperature, and high Hk/HcJ at room temperature. Note that, the low temperature in Patent Document 4 is within a range of −180° C.±20° C.

[Patent Document 1] WO2016/121790
[Patent Document 2] Japanese Patent Application Laid-Open No. 2014-209546
[Patent Document 3] Japanese Patent Application Laid-Open No. 2012-23190
[Patent Document 4] Japanese Patent Application Laid-Open No. 2021-155782

SUMMARY

The object of an exemplary embodiment of the present disclosure is to provide an R-T-B based permanent magnet with improved residual magnetic flux density (Br) at room temperature and coercivity (HcJ) at room temperature in good balance, and also a high squareness ratio (Hk/HcJ).

In below, unless mentioned otherwise, magnetic properties are those at room temperature (23.0° C.±1.0° C.).

An R-T-B based permanent magnet of exemplary embodiment of the present disclosure includes rare earth elements, transition metal elements, boron, and M; wherein the rare earth elements at least include Nd and Pr, the transition metal elements at least include Fe or a combination of Fe and Co, M includes one or more selected from the group consisting of Al, Cu, Ga, and Zr, an amount of a heavy rare earth element is within a range between 0 mass % or more and 0.20 mass % or less, an amount of boron is within a range between 0.90 mass % or more and 1.00 mass % or less, an amount of carbon is within a range between 0 mass % or more and 0.10 mass % or less, an amount of oxygen is within a range between 0 mass % or more and 0.15 mass % or less, an amount of nitrogen is within a range between 0 mass % or more and 0.15 mass % or less, an amount of M is within a range between 0.30 mass % or more and 1.50 mass % or less, an amount of the rare earth elements based on mass represented by TRE is within a range between 29.00 mass % or more and 31.00 mass % or less, and a value represented by Pr/TRE which is obtained by dividing Pr based on mass by TRE is within a range between 0.30 or larger and 0.50 or smaller.

Pr/C may be 100 or larger in which Pr/C represents a value obtained by dividing the amount of Pr based on mass by the amount of carbon based on mass.

An amount of Cu may be within a range between 0 mass % or more and 0.20 mass % or less.

A total amount of boron and carbon may be within a range between 0.93 mass % or more and 1.07 mass % or less.

The amount of M may be within a range between 0.50 mass % or more and 1.00 mass % or less.

DETAILED DESCRIPTION

Hereinafter, an embodiment of the present disclosure is described.

In the R-T-B based permanent magnet, R stands for rare earth elements, T stands for transition metal elements, and B stands for boron. The rare earth elements include scandium (Sc), yttrium (Y), and lanthanoids. T may be an iron group element. That is, T may be one or more selected from iron (Fe), cobalt (Co), and nickel (Ni). The R-T-B based permanent magnet includes a main phase grain having an $R_2T_{14}B$ type crystal structure. Part of boron included in the $R_2T_{14}B$ type crystal structure may be replaced with carbon. Note that, in the case of "R-T-B based permanent magnet" and "$R_2T_{14}B$ type crystal structure", the transition metal elements T do not include the rare earth elements R.

The R-T-B based permanent magnet according to the present embodiment at least includes the rare earth elements, the transition metal elements, boron, and M. The R-T-B based permanent magnet according to the present embodiment at least includes neodymium (Nd) and praseodymium (Pr) as the rare earth elements. The R-T-B based permanent magnet according to the present embodiment at least includes Fe or a combination of Fe and Co as the transition metal elements. M is one or more selected from aluminum (Al), copper (Cu), gallium (Ga), and zirconium (Zr).

In below, an amount of each component included in the R-T-B based permanent magnet is described; and unless mentioned otherwise, it is an amount in 100 mass % of the R-T-B based permanent magnet. Here, "in 100 mass % of the R-T-B based permanent magnet" means that a total amount of all of the elements is 100 mass %.

An amount of rare earth elements in the R-T-B based permanent magnet based on mass is represented by TRE, and TRE is within a range of 29.00 mass % or more and 31.00 mass % or less. Further, TRE may be within a range of 30.00 mass % or more and 31.00 mass % or less. When TRE is too small, HcJ tends to decrease. When TRE is too large, Br tends to decrease.

Among the rare earth elements, gadolinium (Gd), terbium (Tb), dysprosium (Dy), holmium (Ho), erbium (Er), thulium (Tm), ytterbium (Yb), and lutetium (Lu) are grouped as heavy rare earth elements (RH); and other rare earth elements are grouped as light rare earth elements (RL).

Regarding a type of RL included in the R-T-B based permanent magnet, there is no particular limitation except that Nd and Pr are at least included. A total amount of Nd and Pr is not particularly limited. For example, it may be within a range of 29.00 mass % or more and 31.00 mass % or less. The R-T-B based permanent magnet may include RL within a range which does not significantly compromise the magnetic properties of the R-T-B based permanent magnet. Specifically, the total amount of RL other than Nd and Pr may be within a range of 0 mass % or more and 0.20 mass % or less.

A total amount of RH in the R-T-B based permanent magnet is within a range of 0 mass % or more and 0.20 mass % or less. That is, the R-T-B based permanent magnet may not include RH. A type of RH included in the R-T-B based permanent magnet is not particularly limited. For example, RH included in the R-T-B based permanent magnet may be one or more selected from Gd, Tb, Dy, and Ho; or it may be one or more selected from Tb, Dy, and Ho. When the amount of RH is too large, Br tends to decrease.

When a value obtained by dividing TRE by the amount of Pr based on mass is represented by Pr/TRE, then Pr/TRE in the R-T-B based permanent magnet is within a range of 0.30 or more and 0.50 or less. That is, a proportion of Pr to the rare earth elements included in the R-T-B based permanent magnet is 30% or more and 50% or less based on mass. Also, Pr/TRE may be within a range of 0.40 or larger and 0.50 or less. When Pr/TRE is too small, HcJ tends to decrease. When Pr/TRE is too large, Hk/HcJ tends to decrease.

The R-T-B based permanent magnet at least includes Fe or a combination of Fe and Co. An amount of Co in the R-T-B based permanent magnet is not particularly limited. For example, the amount of Co may be within a range of 0 mass % or more and 2.00 mass % or less, or within a range of 1.10 mass % or more and 1.50 mass % or less. When the amount of Co is larger than 2.00 mass %, the raw material cost tends to increase. Particularly, from the point of lowering the costs while maintaining high properties, the amount of Co may be within a range of 0 mass % or more and 0.50 mass % or less.

An amount of boron in the R-T-B based permanent magnet (hereinafter, boron may be simply referred to as B) is within a range of 0.90 mass % or more and 1.00 mass % or less. It may be within a range of 0.90 mass % or more and 0.95 mass % or less. When the amount of B is too small, Hk/HcJ tends to decrease. When the amount of B is too large, HcJ tends to decrease.

An amount of carbon (hereinafter, carbon may be simply referred to as C) in the R-T-B based permanent magnet is within a range of 0 mass % or more and 0.10 mass % or less. That is, the R-T-B based permanent magnet may not include C. The amount of C may be within a range of 0.02 mass % or more and 0.09 mass % or less. When the amount of C is less than 0.02 mass %, efficiency of fine pulverization during the production of the R-T-B based permanent magnet tends to decrease. When the amount of C is too large, HcJ tends to decrease.

A total amount of B and C (hereinafter, a total amount of B and C may be simply referred to as B+C) in the R-T-B based permanent magnet may be within a range of 0.93 mass % or more and 1.07 mass % or less, or it may be within a range of 0.93 mass % or more and 1.02 mass % or less. When B+C is within the above-mentioned range, Br and HcJ tend to further improve.

When the value obtained by dividing the amount of Pr based on mass by the amount of C based on mass is represented by Pr/C, then Pr/C may be 100 or larger, or 150 or larger. There is no upper limit of Pr/C. For example, Pr/C may be 600 or less, or 400 or less. When Pr/C is 100 or larger, HcJ tends to further improve.

The amount of oxygen (hereinafter, oxygen may be simply referred to as O) in the R-T-B based permanent magnet is within a range of 0 mass % or more and 0.15 mass % or less. That is, the R-T-B based permanent magnet may not include O. The amount of O may be within a range of 0.04 mass % or more and 0.15 mass % or less, or may be within a range of 0.04 mass % or more and 0.10 mass % or less. The costs of production increases when the R-T-B based permanent magnet having less than 0.04 mass % of O is produced. When the amount of O is too large, HcJ tends to decrease.

An amount of nitrogen (hereinafter, nitrogen may be simply referred to as N) in the R-T-B based permanent magnet is within a range of 0 mass % or more and 0.15 mass % or less. That is, the R-T-B based permanent magnet may not include N. The amount of N may be within a range of 0.03 mass % or more and 0.10 mass % or less, or may be within a range of 0.05 mass % or more and 0.07 mass % or less. The costs of production increase when the R-T-B based permanent magnet with less than 0.03 mass % of N is produced. When the amount of N is too large, HcJ tends to decrease.

An amount of M in the R-T-B based permanent magnet, that is, a total amount of Al, Cu, Ga, and Zr in the R-T-B based permanent magnet, is within a range of 0.30 mass % or more and 1.50 mass % or less. The amount of M may be within a range of 0.50 mass % or more and 1.00 mass % or less, or may be within a range of 0.65 mass % or more and 1.00 mass % or less. When the amount of M is too small, HcJ tends to decrease.

An amount of Cu in the R-T-B based permanent magnet may be within a range of 0 mass % or more and 0.40 mass % or less, may be within a range of 0 mass % or more and 0.20 mass % or less, may be within a range of 0.05 mass % or more and 0.20 mass % or less, or may be within a range of 0.05 mass % or more and 0.19 mass % or less. When the amount of Cu is 0.20 mass % or less, HcJ tends to further improve, and when the amount of Cu is 0.19 mass % or less, HcJ tends to improve even more.

An amount of Al in the R-T-B base permanent magnet may be within a range of 0.02 mass % or more and 0.35 mass % or less, or may be within a range of 0.05 mass % or more and 0.20 mass % or less.

An amount of Zr in the R-T-B based permanent magnet may be within a range of 0 mass % or more and 0.35 mass % or less, may be within a range of 0.15 mass % or more and 0.35 mass % or less, or may be within a range of 0.20 mass % or more and 0.35 mass % or less.

An amount of Ga may be within a range of 0 mass % or more and 0.50 mass % or less, may be within a range of 0.20 mass % or more and 0.40 mass % or less, or may be within a range of 0.25 mass % or more and 0.40 mass % or less.

An amount of Fe in the R-T-B based permanent magnet is not particularly limited. The amount of Fe in the R-T-B based permanent magnet may be substantially a remainder in the R-T-B based permanent magnet. Specifically, an amount of each element other than the rare earth elements, Fe, Co, B, C, O, N, and M (for example, Nb, Si, Mg, Mn, Zn, and so on) may be within a range of 0 mass % or more and 0.05 mass % or less.

An amount of each element other than the rare earth elements, Fe, Co, B, C, O, N, and M (for example, an amount of element such as Nb, Si, Mg, Mn, Zn, and so on) in the R-T-B based permanent magnet may be within a range of 0 mass % or more and 0.01 mass % or less.

A total amount of elements in the R-T-B based permanent magnet other than the rare earth elements, Fe, Co, B, C, O, N, and M may be within a range of 0 mass % or more and 0.50 mass % or less.

The elements other than the rare earth elements, Fe, Co, B, and M (for example, C, O, N, Nb, Si, Mg, Mn, Zn, and so on) in the R-T-B based permanent magnet may be added intentionally during the production of the R-T-B based permanent magnet, or it may be included as impurities derived from the raw material of the R-T-B based permanent magnet.

When the R-T-B based permanent magnet has the above-mentioned compositions, Br at room temperature and HcJ at room temperature are improved in good balance, and also the R-T-B based permanent magnet with high Hk/HcJ can be obtained.

Generally, the smaller the Pr/TRE in the R-T-B based permanent magnet is, the better the temperature characteristics of the R-T-B based permanent magnet is, and the smaller the decrease in coercivity is during temperature is increasing. Also, when a didymium alloy, which substantially only includes Nd and Pr and Pr/TRE is within a range of 0.20 to 0.25 or so, is used as a raw material of the light rare earth element, the raw material costs for producing the R-T-B based permanent magnet tends to be the least. When Pr/TRE of the R-T-B based permanent magnet is larger than or smaller than Pr/TRE of the didymium alloy, the raw material costs tend to further increase.

When Pr/TRE of the R-T-B based permanent magnet is within a range of 0.30 or larger and 0.50 or less and the amounts of other elements are within the predetermined ranges, the present inventors have found that a residual magnetic flux density (Br) at room temperature and coercivity (HcJ) at room temperature improve in good balance, and also the R-T-B based permanent magnet with a high squareness ratio (Hk/HcJ) can be obtained.

<Method for Producing R-T-B Based Permanent Magnet>

Hereinafter, an example of method for producing the R-T-B based permanent magnet according to the present embodiment is described. The method for producing the R-T-B based permanent magnet (R-T-B based sintered magnet) according to the present embodiment includes the following steps. Note that, steps (g) to (i) described in below may be omitted.

(a) An alloy preparation step for preparing a raw material alloy.
(b) A pulverization step for pulverizing the raw material alloy to obtain an alloy powder.
(c) A pressing step for pressing the obtained alloy powder to obtain a green compact.
(d) A sintering step for sintering the green compact to obtain an R-T-B based permanent magnet.
(e) An aging treatment step for aging the R-T-B based permanent magnet.
(f) A cooling step for cooling the R-T-B based permanent magnet.
(g) A machining step for machining the R-T-B based permanent magnet.
(h) A grain boundary diffusion step for diffusing the heavy rare earth elements in the grain boundary of the R-T-B based permanent magnet.
(i) A surface treatment step for surface treating the R-T-B based permanent magnet.

[Alloy Preparation Step]

First, the raw material alloy is prepared (alloy preparation step). In below, a strip casting method is explained as an example of the alloy preparation step, however, the alloy preparation step is not limited to a strip casting method.

First, raw material metals corresponding to the composition of the raw material alloy are prepared, and the raw material metals prepared under vacuumed atmosphere or inert gas atmosphere such as argon (Ar) gas are melted. Then, the melted raw material metals are poured on to a metallic rotating roll for quenching, and it is crushed. Thereby, the raw material alloy of flake shape is produced. Note that, for the present embodiment, a one-alloy method is explained, however, a two-alloy method which obtains the raw material alloy mixing two alloys of a first alloy and a second alloy may be used.

Types of the raw material metals are not particularly limited. For example, a metal such as rare earth metals, pure iron, pure cobalt, an alloy such as a rare earth element alloy, and/or compounds such as ferroboron and so on can be used. A casting method for casting the raw material metals is not particularly limited. For example, an ingot casting method, a strip casting method, a book mold casting method, a centrifugal casting method, and so on may be mentioned. If needed, a homogenization treatment (solution treatment) may be carried out to the obtained raw material alloy, when solidification segregation is found.

[Pulverization Step]

After the raw material alloy is produced, the raw material alloy is pulverized (pulverization step). The pulverization step may be carried out in a two-step process which includes a coarse pulverization step of pulverizing the alloy to a particle size of about several hundred μm to several mm; and a fine pulverization step of finely pulverizing to a particle size of about several μm. However, a single-step process consisting solely of a fine pulverization step may be carried out.

(Coarse Pulverization Step)

During the coarse pulverization step, the raw material alloy is coarsely pulverized till the particle size becomes approximately several hundred μm to several mm (coarse pulverization step). Thereby, a coarsely pulverized powder of the raw material alloy is obtained. For example, coarse pulverization can be carried out by hydrogen storage pulverization. In general, when hydrogen is stored in the raw material alloy, phases constituting the raw material alloy expand in some cases. Hydrogen storage pulverization can be carried out by causing self-collapsing pulverization based on the differences of volume expansion coefficient in different phases when hydrogen is stored in the raw material alloy.

Dehydrogenation may be carried out to the coarsely pulverized powder obtained by hydrogen storage pulverization. A method of dehydrogenation is not particularly limited. For example, the coarsely pulverized powder may be heated to release hydrogen. A heating condition for hydrogen release from the coarsely pulverized powder is not particularly limited. For example, it may be heated at a temperature within a range of 300 to 650° C. under Ar flow or in vacuum.

Note that, the coarse pulverization method is not limited to the above-mentioned hydrogen storage pulverization. For example, coarse pulverization may be carried out using a coarse pulverizer such as a stamp mill, a jaw crusher, a brown mill, and so on under inert gas atmosphere. When coarse pulverization is carried out using these methods, dehydrogenation is not necessary.

Also, in order to obtain the R-T-B based permanent magnet having high magnetic properties, an atmosphere of each step from the pulverization step to the sintering step which is described in below may be a low oxygen concentration atmosphere. The oxygen concentration is adjusted by controlling atmosphere at each step of the production.

In general, when the rare earth elements, T element, and M element are deposited in the grain boundary, a rare earth element rich phase is formed. The rare earth element rich phase magnetically separates the main phase grains, thereby HcJ of the R-T-B based permanent magnet improves.

When the oxygen concentration is too high during the production steps, the rare earth elements in the alloy powder obtained by pulverizing the raw material alloy are oxidized, and oxides of the rare earth elements tend to be formed. The oxides of the rare earth elements are not reduced while sintering, hence these are deposited into the grain boundary as the oxides of the rare earth elements. That is, the proportion of the rare earth elements which are not oxidized during the production steps decreases, and a volume ratio of the rare earth element rich phase decreases. Since the volume ratio of the rare earth element rich phase which magnetically separates the main phase grains decreases, the obtained R-T-B based permanent magnet tends to have a decreased HcJ. Therefore, for example, each step (fine pulverization step and pressing step) may be carried out under the oxygen concentration of 100 ppm or less.

(Fine Pulverization Step)

After coarsely pulverizing the raw material alloy, the obtained coarsely pulverized powder is finely pulverized till the average particle size becomes several μm or so (fine pulverization step). Thereby, a finely pulverized powder of raw material alloy is obtained. By further pulverizing the coarsely pulverized powder for fine pulverization, a finely pulverized powder can be obtained. D50 of the particles included in the finely pulverized powder is not particularly limited. For example, D50 may be within a range of 2.0 μm or larger and 4.5 μm or smaller, or may be within a range of 2.5 μm or larger and 3.5 μm or smaller. The smaller the D50 is, the easier it is for HcJ of the R-T-B based permanent magnet according to the present embodiment to improve. However, it may also be easy to cause abnormal grain growth during the sintering step, and Hk/HcJ tends to decrease easily. The larger the D50 is, the harder it is for the abnormal grain growth to occur during the sintering step, and it becomes difficult for Hk/HcJ to decrease. However, HcJ of the R-T-B based permanent magnet according to the present embodiment tends to decrease easily.

The fine pulverization is carried out by adjusting conditions of fine pulverization such as pulverization time and so on, and by carrying out further pulverization to the powder obtained by coarse pulverization using a fine pulverizer such as a jet mill, a ball mill, a vibration mil, a wet attritor, or so. Below explains a jet mill. A jet mill is a fine pulverizer in which a high-pressure inert gas (for example, He gas, $N_2$ gas, and Ar gas) is released from a narrow nozzle to generate a high-speed gas flow, and this high-speed gas flow accelerates the coarsely pulverized powder of a raw material alloy to collide against each other or collide with a target or a container wall. In some cases, a jet mill may include a classifier. The size of the finely pulverized powder may be controlled by adjusting a condition of the classifier upon its use.

When the coarsely pulverized powder of the raw material alloy is finely pulverized, a pulverization aid may be added. A type of the pulverization aid is not particularly limited. For example, an organic lubricant or a solid lubricant may be used. As the organic lubricant, oleic amide, lauramide, zinc stearate, and the like may be mentioned. As the solid lubricant, for example, graphite and the like may be mentioned. By adding the pulverization aid, a finely pulverized powder can be obtained which tends to be oriented easily when magnetic field is applied during the pressing step. Either one of the organic lubricant or the solid lubricant may be used, or both of these may be mixed and used. This is because particularly when the solid lubricant is only used, a degree of orientation may decrease in some cases.

[Pressing Step]

The finely pulverized powder is pressed into a desired shape (pressing step). The pressing step is carried out by placing the finely pulverized powder in a mold arranged in electromagnets, and then pressure is applied, thereby the finely pulverized powder is pressed and a green compact is obtained. At this time, by carrying out the pressing step while applying a magnetic field, the finely pulverized powder can be pressed while the finely pulverized powder is being oriented in a direction of axis of an easy magnetization. As a result, the green compact in which the finely pulverized powder is oriented in a direction of axis of an easy magnetization can be obtained. By using such green compact, the R-T-B based permanent magnet with even stronger magnetic anisotropy can be obtained. Also, a pressing aid may be added. A type of the pressing aid is not particularly limited. A lubricant which is the same as the pulverization aid may be used as a pressing aid. The pressing step may be carried out using a mold releasing agent or so.

During pressure application, for example, pressure within a range of 30 MPa or more and 300 MPa or less may be applied. For example, as applied magnetic field, magnetic field within a range of 1000 kA/m or larger and 1600 kA/m or smaller may be applied. The applied magnetic field is not limited to static magnetic field, and it may also be pulse magnetic field. Also, static magnetic field and pulse magnetic field may be used together.

Note that, as a pressing method, a dry pressing method in which the finely pulverized powder as mentioned in above is directly pressed may be used, or a wet pressing method in which a slurry having the finely pulverized powder dispersed in a solvent such as oil and so on is pressed may be used.

A shape of the green compact obtained by pressing the finely pulverized powder is not particularly limited, and it can be a shape corresponding to a desired shape of the R-T-B based sintered magnet such as a rectangular parallelepiped shape, a flat plate shape, a columnar shape, a ring shape, and so on.

[Sintering Step]

The obtained green compact is sintered in vacuum or in inert gas atmosphere to obtain the R-T-B based permanent magnet (sintering step). A holding temperature and a temperature holding time of the sintering step need to be adjusted depending on various conditions such as a composition (mainly, the amounts of the rare earth elements and B), a method of pulverization, particle sizes, and particle size distribution, and so on. A holding temperature during the sintering step may be within a range of 1000° C. or higher and 1100° C. or lower, or may be within a range of 1020° C. or higher and 1070° C. or lower. The temperature holding time is not particularly limited, and for example, it may be within a range of 2 hours or longer and 50 hours or shorter, or may be within a range of 4 hours or longer and 40 hours or shorter. The shorter the length of the temperature holding time is, the higher the productivity is. Atmosphere during the temperature holding time is not particularly limited. For example, it may be under inert gas atmosphere, or under vacuum atmosphere of less than 100 Pa or less than 10 Pa. A heating rate before the temperature reaches the holding temperature is not particularly limited. When the green compact is heated, the finely pulverized powder included in the green compact undergoes liquid phase sintering, and the R-T-B based permanent magnet according to the present embodiment can be obtained. A cooling rate after a sintered body is obtained by sintering the green compact is not particularly limited, and the sintered body may be quenched in order to improve productivity. The sintered body may be quenched at a rate of 30° C./min or faster.

[Aging Treatment Step]

After sintering the green compact, aging treatment is performed to the R-T-B based permanent magnet (aging treatment step). After sintering, the aging treatment is performed to the obtained R-T-B based permanent magnet at a temperature lower than a temperature during the sintering step. In below, a method of separating the aging treatment step in two steps which are a first aging treatment and a second aging treatment will be described, however, either one of the aging treatments may be carried out, or three or more steps of aging treatments may be carried out.

The holding temperature and the holding time during each of the aging treatments are not particularly limited. For example, the first aging treatment may be carried out at the holding temperature within a range of 800° C. or higher and 900° C. or lower for 30 minutes or longer to 4 hours or shorter. The heating rate before reaching the holding temperature may be 5° C./min or faster and 50° C./min or slower. Atmosphere during the first aging treatment may be inert gas atmosphere (for example, He gas and Ar gas) having pressure of atmospheric pressure or higher. The second aging treatment may be performed under the same conditions as the first aging treatment except for the holding temperature being within a range of 450° C. or higher and 550° C. or lower. By carrying out the aging treatments, the magnetic properties of the R-T-B based permanent magnet can be improved. Also, the aging treatment step may be performed after the machining step described in below.

[Cooling Step]

After the aging treatment step (the first aging treatment and the second aging treatment) is performed to the R-T-B based permanent magnet, the R-T-B based permanent magnet is cooled under inert gas atmosphere (cooling step). Thereby, the R-T-B based permanent magnet according to the present embodiment can be obtained. The cooling rate is not particularly limited, and it may be 30° C./min or faster.

[Machining Step]

The obtained R-T-B based permanent magnet may be machined into a desired shape if needed (machining step). A machining method may be, for example, shape processing such as cutting and grinding, and chamfering such as barrel polishing.

[Grain Boundary Diffusion Step]

Heavy rare earth elements may be further diffused to the grain boundary of the machined R-T-B based permanent magnet (grain boundary diffusion step). A method of grain boundary diffusion is not particularly limited. For example, the surface of the R-T-B based permanent magnet may be coated with a compound including the heavy rare earth elements, and then the heat treatment may be carried out; or the compound including the heavy rare earth elements may be adhered on the surface of the R-T-B based permanent magnet by deposition and the like, and then the heat treatment may be carried out. By carrying out the grain boundary diffusion, HcJ of the R-T-B based permanent magnet can be further improved.

[Surface Treatment Step]

The R-T-B based permanent magnet obtained by going through the above-mentioned steps may be further subjected to a surface treatment such as plating, resin coating, an oxidation treatment, and a chemical treatment, and so on (surface treatment step). Thereby, corrosion resistance can be further improved.

The R-T-B based permanent magnet obtained as such achieves improved Br and HcJ in good balance, and also achieves high Hk/HcJ.

Note that, the present disclosure is not limited to the above-mentioned embodiment, and various modifications may be made within the scope of the present disclosure. For example, regarding the method for producing the R-T-B based permanent magnet, hot molding and hot working may be carried out instead of sintering.

The use of the R-T-B based permanent magnet of the present disclosure is not particularly limited. Particularly, the R-T-B based permanent magnet of the present disclosure may be suitably used for a motor, a generator, and so on used at room temperature, such as a voice coil motor, a wind power generator, and so on. Note that, when the R-T-B based permanent magnet according to the present disclosure is used for such use, magnetic flux density of the magnet at the operating point of the motor can be increased easily since Hk/HcJ is high.

EXAMPLES

In below, the present disclosure is described in further detail using the examples, however, the present disclosure is not to be limited thereto.

Experiment Example 1

(Alloy Preparation Step)

In an alloy preparation step, raw material alloys which give the R-T-B based permanent magnets having the compositions shown in Tables 1 to 5 at the end were prepared. An amount of each element other than Fe and also not shown in Tables 1 to 5 was less than 0.01 mass % for each of the element.

First, raw material metals including the predetermined elements were prepared. As the raw material metals, for example, simple elements shown in Table 1 to Table 5, alloys including the elements shown in Table 1 to Table 5, and compounds including the elements shown in Table 1 to Table 5, and so on were appropriately selected, and the raw material metals were prepared.

Next, these raw material metals were weighed, and raw material alloys were prepared using a strip casting method. At this time, the raw material alloys were prepared so that the magnets satisfying the compositions shown in Table 1 to Table 5 were obtained at the end.

(Pulverization Step)

The raw material alloy obtained after the alloy preparation step was pulverized, and an alloy powder was obtained. The raw material alloy was pulverized in two steps of a coarse pulverization and a fine pulverization. The coarse pulverization was carried out using hydrogen storage pulverization. After storing hydrogen in the raw material alloy, dehydrogenation was carried out while flowing Ar or in vacuum within a temperature range of 300 to 600° C. After the coarse pulverization, an alloy powder having a particle size of several hundred μm to several mm or so was obtained.

Fine pulverization was carried out by adding oleic amide as a pulverization aid to 100 parts by mass of the alloy powder obtained by coarse pulverization, then these were mixed using a jet mill to obtain a mixed powder. The added amount of oleic amide was adjusted so that the magnets having the compositions shown in Table 1 to Table 5 can be obtained. Nitrogen gas was used for the jet mill. Fine pulverization was carried out until D50 of the alloy powder was about 3.6 μm or so.

Regarding Sample No. 24 of which an oxygen amount was drastically changed from other experiment examples, 500 ppm of oxygen gas was mixed to nitrogen gas. Regarding Sample No. 25 of which an oxygen amount was drastically changed from other experiment examples, 2000 ppm of oxygen gas was mixed to nitrogen gas.

(Pressing Step)

In the pressing step, the obtained alloy powder after the pulverization step was pressed in magnetic field to obtain a green compact. After the alloy powder was placed in a mold arranged in electromagnets, pressing was carried out by applying pressure while also applying magnetic field using electromagnets. The applied magnetic field was 1200 kA/m. The applied pressured was 40 MPa.

(Sintering Step)

In the sintering step, the obtained green compact was sintered to obtain a sintered body. The holding temperature of sintering was 1070° C., and a holding time of sintering was 4 hours. Sintering was carried out in vacuumed atmosphere or inert gas atmosphere.

(Aging Treatment Step)

In the aging treatment step, the aging treatment was carried out to the obtained sintered body to obtain an R-T-B based permanent magnet. The aging treatment step was carried out in two steps of a first aging treatment and a second aging treatment.

A holding temperature of the first aging treatment was 850° C., and a holding time was 1.0 hour. Atmosphere of the first aging treatment was Ar atmosphere.

A holding temperature of the second aging treatment was 480° C., and a holding time was 1.5 hours. Atmosphere of the second aging treatment was Ar atmosphere.

Compositional analysis such as a fluorescence X-ray analysis, an inductively coupled plasma emission spectroscopic analysis (ICP analysis), and a gas analysis were carried out to verify that the composition of the R-T-B based permanent magnet obtained at the end of each example and comparative example were the compositions shown in Table 1 to Table 5. Particularly, the amount of C was measured using a combustion in oxygen stream-infrared absorption method. Also, the amount of B was measured using an ICP analysis.

(Evaluation)

The magnetic properties of the R-T-B based permanent magnet from each example and each comparative example were measured using a BH tracer. As the magnetic properties, Br, HcJ, and Hk/HcJ were measured. Results are shown in Table 1 to Table 5.

The R-T-B based permanent magnets of the present examples satisfying all of Br of 1450 mT or larger, HcJ of 1200 kA/m or larger, and Hk/HcJ of 95% or higher were considered good. In regards with Br, 1460 mT or larger was considered even better. In regards with HcJ, 1320 kA/m or larger was considered even better, and 1350 kA/m or larger was considered particularly good.

TABLE 1

| Example/ | | Rare earth element | | | Transition metal element | | Boron, Carbon, Oxygen, Nitrogen | | | | | |
|---|---|---|---|---|---|---|---|---|---|---|---|---|
| Comparative example | Sample No | TRE mass % | Nd mass % | Pr mass % | Co mass % | Fe mass % | B + C mass % | B mass % | C mass % | O mass % | N mass % | M mass % |
| Comparative example | 1 | 28.50 | 17.10 | 11.40 | 1.30 | Bal. | 1.01 | 0.94 | 0.07 | 0.06 | 0.06 | 0.65 |
| Example | 2 | 29.00 | 17.40 | 11.60 | 1.30 | Bal. | 1.03 | 0.95 | 0.08 | 0.06 | 0.05 | 0.65 |
| Example | 3 | 29.50 | 17.70 | 11.80 | 1.30 | Bal. | 1.02 | 0.94 | 0.08 | 0.05 | 0.05 | 0.65 |
| Example | 1 | 30.00 | 18.00 | 12.00 | 1.30 | Bal. | 1.02 | 0.94 | 0.08 | 0.06 | 0.06 | 0.65 |
| Example | 5 | 30.50 | 18.30 | 12.20 | 1.30 | Bal. | 1.01 | 0.93 | 0.08 | 0.06 | 0.05 | 0.65 |
| Example | 6 | 31.00 | 18.60 | 12.40 | 1.30 | Bal. | 1.01 | 0.94 | 0.07 | 0.05 | 0.06 | 0.65 |
| Comparative example | 7 | 31.50 | 18.90 | 12.60 | 1.30 | Bal. | 1.01 | 0.94 | 0.07 | 0.05 | 0.06 | 0.65 |
| Comparative example | 8 | 30.00 | 24.00 | 6.00 | 1.30 | Bal. | 1.02 | 0.94 | 0.08 | 0.05 | 0.06 | 0.65 |
| Comparative example | 9 | 30.00 | 22.50 | 7.50 | 1.30 | Bal. | 1.02 | 0.94 | 0.08 | 0.06 | 0.07 | 0.65 |
| Example | 10 | 30.00 | 21.00 | 9.00 | 1.30 | Bal. | 0.98 | 0.92 | 0.06 | 0.05 | 0.05 | 0.65 |
| Example | 4 | 30.00 | 18.00 | 12.00 | 1.30 | Bal. | 1.02 | 0.94 | 0.08 | 0.06 | 0.06 | 0.65 |
| Example | 11 | 30.00 | 15.00 | 15.00 | 1.30 | Bal. | 1.02 | 0.95 | 0.07 | 0.06 | 0.06 | 0.65 |
| Comparative example | 12 | 30.00 | 12.00 | 18.00 | 1.30 | Bal. | 1.01 | 0.93 | 0.08 | 0.07 | 0.06 | 0.65 |

| Example/ | M | | | | Amount ratio | | Magnetic properties | | |
|---|---|---|---|---|---|---|---|---|---|
| Comparative example | Al mass % | Cu mass % | Zr mass % | Ga mass % | Pr/TRE | Pr/C | Br mT | HcJ kA/m | Hk/HcJ % |
| Comparative example | 0.05 | 0.15 | 0.20 | 0.25 | 0.40 | 163 | 1498 | 1183 | 99 |
| Example | 0.05 | 0.15 | 0.20 | 0.25 | 0.40 | 145 | 1483 | 1322 | 98 |
| Example | 0.05 | 0.15 | 0.20 | 0.25 | 0.40 | 148 | 1475 | 1345 | 98 |
| Example | 0.05 | 0.15 | 0.20 | 0.25 | 0.40 | 150 | 1470 | 1380 | 98 |
| Example | 0.05 | 0.15 | 0.20 | 0.25 | 0.40 | 153 | 1465 | 1410 | 98 |
| Example | 0.05 | 0.15 | 0.20 | 0.25 | 0.40 | 177 | 1460 | 1420 | 98 |
| Comparative example | 0.05 | 0.15 | 0.20 | 0.25 | 0.40 | 180 | 1431 | 1520 | 97 |
| Comparative example | 0.05 | 0.15 | 0.20 | 0.25 | 0.20 | 75 | 1480 | 1175 | 99 |

TABLE 1-continued

| | | | | | | | | | |
|---|---|---|---|---|---|---|---|---|---|
| Comparative example | 0.05 | 0.15 | 0.20 | 0.25 | 0.25 | 94 | 1473 | 1198 | 99 |
| Example | 0.05 | 0.15 | 0.20 | 0.25 | 0.30 | 150 | 1472 | 1325 | 99 |
| Example | 0.05 | 0.15 | 0.20 | 0.25 | 0.40 | 150 | 1470 | 1380 | 98 |
| Example | 0.05 | 0.15 | 0.20 | 0.25 | 0.50 | 214 | 1469 | 1385 | 97 |
| Comparative example | 0.05 | 0.15 | 0.20 | 0.25 | 0.60 | 225 | 1472 | 1378 | 88 |

TABLE 2

| Example/ | | Rare earth element | | | Transition metal element | | Boron, Carbon, Oxygen, Nitrogen | | | | | |
|---|---|---|---|---|---|---|---|---|---|---|---|---|
| Comparative example | Sample No | TRE mass % | Nd mass % | Pr mass % | Co mass % | Fe mass % | B + C mass % | B mass % | C mass % | O mass % | N mass % | M mass % |
| Comparative example | 13 | 30.00 | 18.00 | 12.00 | 1.30 | Bal. | 0.95 | 0.87 | 0.08 | 0.06 | 0.05 | 0.65 |
| Example | 14 | 30.00 | 18.00 | 12.00 | 1.30 | Bal. | 0.98 | 0.90 | 0.08 | 0.04 | 0.05 | 0.65 |
| Example | 15 | 30.00 | 18.00 | 12.00 | 1.30 | Bal. | 1.00 | 0.92 | 0.08 | 0.04 | 0.05 | 0.65 |
| Example | 4 | 30.00 | 18.00 | 12.00 | 1.30 | Bal. | 1.02 | 0.94 | 0.08 | 0.06 | 0.06 | 0.65 |
| Example | 16 | 30.00 | 18.00 | 12.00 | 1.30 | Bal. | 1.04 | 0.97 | 0.07 | 0.05 | 0.06 | 0.65 |
| Example | 17 | 30.00 | 18.00 | 12.00 | 1.30 | Bal. | 1.07 | 1.00 | 0.07 | 0.07 | 0.06 | 0.65 |
| Comparative example | 18 | 30.00 | 18.00 | 12.00 | 1.30 | Bal. | 1.11 | 1.03 | 0.08 | 0.06 | 0.05 | 0.65 |
| Example | 19 | 30.00 | 18.00 | 12.00 | 1.30 | Bal. | 1.00 | 0.95 | 0.05 | 0.06 | 0.05 | 0.65 |
| Example | 4 | 30.00 | 18.00 | 12.00 | 1.30 | Bal. | 1.02 | 0.94 | 0.08 | 0.06 | 0.06 | 0.65 |
| Example | 20 | 30.00 | 18.00 | 12.00 | 1.30 | Bal. | 1.02 | 0.93 | 0.09 | 0.05 | 0.07 | 0.65 |
| Example | 21 | 30.00 | 18.00 | 12.00 | 1.30 | Bal. | 1.04 | 0.94 | 0.10 | 0.06 | 0.06 | 0.65 |
| Comparative example | 22 | 30.00 | 18.00 | 12.00 | 1.30 | Bal. | 1.05 | 0.94 | 0.11 | 0.05 | 0.07 | 0.65 |
| Comparative example | 23 | 30.00 | 18.00 | 12.00 | 1.30 | Bal. | 1.09 | 0.95 | 0.14 | 0.06 | 0.07 | 0.65 |
| Example | 24a | 30.00 | 18.00 | 12.00 | 1.30 | Bal. | 1.02 | 0.94 | 0.08 | 0.04 | 0.07 | 0.65 |
| Example | 4 | 30.00 | 18.00 | 12.00 | 1.30 | Bal. | 1.02 | 0.94 | 0.08 | 0.06 | 0.06 | 0.65 |
| Example | 24b | 30.00 | 18.00 | 12.00 | 1.30 | Bal. | 1.02 | 0.94 | 0.08 | 0.10 | 0.06 | 0.65 |
| Example | 24 | 30.00 | 18.00 | 12.00 | 1.30 | Bal. | 1.01 | 0.94 | 0.07 | 0.15 | 0.06 | 0.65 |
| Comparative example | 25a | 30.00 | 18.00 | 12.00 | 1.30 | Bal. | 1.01 | 0.93 | 0.08 | 0.20 | 0.06 | 0.65 |
| Comparative example | 25 | 30.00 | 18.00 | 12.00 | 1.30 | Bal. | 1.01 | 0.93 | 0.08 | 0.34 | 0.05 | 0.65 |

| Example/ | M | | | Amount ratio | | | Magnetic properties | | |
|---|---|---|---|---|---|---|---|---|---|
| Comparative example | Al mass % | Cu mass % | Zr mass % | Ga mass % | Pr/TRE | Pr/C | Br mT | HcJ kA/m | Hk/HcJ % |
| Comparative example | 0.05 | 0.15 | 0.20 | 0.25 | 0.40 | 150 | 1432 | 1341 | 84 |
| Example | 0.05 | 0.15 | 0.20 | 0.25 | 0.40 | 150 | 1460 | 1397 | 95 |
| Example | 0.05 | 0.15 | 0.20 | 0.25 | 0.40 | 150 | 1463 | 1401 | 97 |
| Example | 0.05 | 0.15 | 0.20 | 0.25 | 0.40 | 150 | 1470 | 1380 | 98 |
| Example | 0.05 | 0.15 | 0.20 | 0.25 | 0.40 | 171 | 1475 | 1341 | 98 |
| Example | 0.05 | 0.15 | 0.20 | 0.25 | 0.40 | 171 | 1477 | 1331 | 99 |
| Comparative example | 0.05 | 0.15 | 0.20 | 0.25 | 0.40 | 150 | 1483 | 1150 | 99 |
| Example | 0.05 | 0.15 | 0.20 | 0.25 | 0.40 | 240 | 1467 | 1392 | 98 |
| Example | 0.05 | 0.15 | 0.20 | 0.25 | 0.40 | 150 | 1470 | 1380 | 98 |
| Example | 0.05 | 0.15 | 0.20 | 0.25 | 0.40 | 133 | 1473 | 1353 | 97 |
| Example | 0.05 | 0.15 | 0.20 | 0.25 | 0.40 | 120 | 1478 | 1270 | 99 |
| Comparative example | 0.05 | 0.15 | 0.20 | 0.25 | 0.40 | 109 | 1479 | 1196 | 98 |
| Comparative example | 0.05 | 0.15 | 0.20 | 0.25 | 0.40 | 86 | 1480 | 1171 | 99 |
| Example | 0.05 | 0.15 | 0.20 | 0.25 | 0.40 | 150 | 1472 | 1392 | 98 |
| Example | 0.05 | 0.15 | 0.20 | 0.25 | 0.40 | 150 | 1470 | 1380 | 98 |
| Example | 0.05 | 0.15 | 0.20 | 0.25 | 0.40 | 150 | 1470 | 1365 | 98 |
| Example | 0.05 | 0.15 | 0.20 | 0.25 | 0.40 | 171 | 1472 | 1331 | 98 |
| Comparative example | 0.05 | 0.15 | 0.20 | 0.25 | 0.40 | 150 | 1471 | 1232 | 99 |
| Comparative example | 0.05 | 0.15 | 0.20 | 0.25 | 0.40 | 150 | 1469 | 1188 | 99 |

TABLE 3

| Example/ Comparative example | Sample No | Rare earth element: TRE mass % | Rare earth element: Nd mass % | Rare earth element: Pr mass % | Transition metal element: Co mass % | Transition metal element: Fe mass % | Boron, Carbon, Oxygen, Nitrogen: B + C mass % | B mass % | C mass % | O mass % | N mass % | M mass % |
|---|---|---|---|---|---|---|---|---|---|---|---|---|
| Comparative example | 26 | 30.00 | 18.00 | 12.00 | 1.30 | Bal. | 1.03 | 0.95 | 0.08 | 0.07 | 0.06 | 0.05 |
| Comparative example | 27 | 30.00 | 18.00 | 12.00 | 1.30 | Bal. | 1.00 | 0.93 | 0.07 | 0.06 | 0.05 | 0.15 |
| Example | 28 | 30.00 | 18.00 | 12.00 | 1.30 | Bal | 1.01 | 0.94 | 0.07 | 0.05 | 0.05 | 0.30 |
| Example | 29 | 30.00 | 18.00 | 12.00 | 1.30 | Bal. | 1.02 | 0.95 | 0.07 | 0.07 | 0.06 | 0.45 |
| Example | 30 | 30.00 | 18.00 | 12.00 | 1.30 | Bal. | 1.00 | 0.93 | 0.07 | 0.06 | 0.05 | 0.50 |
| Example | 4 | 30.00 | 18.00 | 12.00 | 1.30 | Bal. | 1.02 | 0.94 | 0.08 | 0.06 | 0.06 | 0.65 |
| Example | 31 | 30.00 | 18.00 | 12.00 | 1.30 | Bal. | 1.00 | 0.93 | 0.07 | 0.06 | 0.06 | 0.80 |
| Example | 32 | 30.00 | 18.00 | 12.00 | 1.30 | Bal. | 1.00 | 0.93 | 0.07 | 0.06 | 0.05 | 0.85 |
| Example | 33 | 30.00 | 18.00 | 12.00 | 1.30 | Bal. | 1.01 | 0.94 | 0.07 | 0.06 | 0.07 | 1.00 |
| Example | 34 | 30.00 | 18.00 | 12.00 | 1.30 | Bal. | 1.01 | 0.93 | 0.08 | 0.07 | 0.06 | 1.10 |
| Example | 35 | 30.00 | 18.00 | 12.00 | 1.30 | Bal. | 1.03 | 0.95 | 0.08 | 0.07 | 0.05 | 1.35 |
| Example | 36 | 30.00 | 18.00 | 12.00 | 1.30 | Bal. | 1.01 | 0.94 | 0.07 | 0.05 | 0.06 | 1.50 |
| Comparative example | 37 | 30.00 | 18.00 | 12.00 | 1.30 | Bal. | 1.06 | 0.94 | 0.12 | 0.05 | 0.06 | 1.65 |
| Example | 38 | 30.00 | 18.00 | 12.00 | 1.30 | Bal. | 1.02 | 0.94 | 0.08 | 0.06 | 0.05 | 0.55 |
| Example | 4 | 30.00 | 18.00 | 12.00 | 1.30 | Bal | 1.02 | 0.94 | 0.08 | 0.06 | 0.06 | 0.65 |
| Example | 39 | 30.00 | 18.00 | 12.00 | 1.30 | Bal. | 1.02 | 0.94 | 0.08 | 0.06 | 0.06 | 0.69 |
| Example | 40 | 30.00 | 18.00 | 12.00 | 1.30 | Bal. | 1.01 | 0.93 | 0.08 | 0.06 | 0.05 | 0.70 |
| Example | 41 | 30.00 | 18.00 | 12.00 | 1.30 | Bal. | 1.01 | 0.94 | 0.07 | 0.07 | 0.05 | 0.72 |
| Example | 42 | 30.00 | 18.00 | 12.00 | 1.30 | Bal. | 1.02 | 0.94 | 0.08 | 0.06 | 0.06 | 0.75 |

| Example/ Comparative example | M: Al mass % | M: Cu mass % | M: Zr mass % | M: Ga mass % | Amount ratio: Pr/ TRE | Amount ratio: Pr/ C | Magnetic properties: Br mT | HcJ kA/m | Hk/HcJ % |
|---|---|---|---|---|---|---|---|---|---|
| Comparative example | 0.05 | 0.00 | 0.00 | 0.00 | 0.40 | 150 | 1483 | 1068 | 99 |
| Comparative example | 0.05 | 0.00 | 0.10 | 0.00 | 0.40 | 171 | 1481 | 1149 | 99 |
| Example | 0.02 | 0.08 | 0.05 | 0.15 | 0.40 | 171 | 1476 | 1228 | 99 |
| Example | 0.05 | 0.10 | 0.10 | 0.20 | 0.40 | 171 | 1473 | 1253 | 97 |
| Example | 0.05 | 0.10 | 0.15 | 0.20 | 0.40 | 171 | 1471 | 1349 | 97 |
| Example | 0.05 | 0.15 | 0.20 | 0.25 | 0.40 | 150 | 1470 | 1380 | 98 |
| Example | 0.05 | 0.15 | 0.35 | 0.25 | 0.40 | 171 | 1467 | 1410 | 97 |
| Example | 0.06 | 0.19 | 0.35 | 0.25 | 0.40 | 171 | 1463 | 1389 | 97 |
| Example | 0.06 | 0.19 | 0.35 | 0.40 | 0.40 | 171 | 1461 | 1367 | 98 |
| Example | 0.06 | 0.19 | 0.35 | 0.50 | 0.40 | 150 | 1454 | 1366 | 97 |
| Example | 0.20 | 0.40 | 0.35 | 0.40 | 0.40 | 150 | 1458 | 1350 | 97 |
| Example | 0.35 | 0.40 | 0.35 | 0.40 | 0.40 | 171 | 1452 | 1327 | 96 |
| Comparative example | 0.50 | 0.50 | 0.40 | 0.25 | 0.40 | 100 | 1433 | 1355 | 97 |
| Example | 0.05 | 0.05 | 0.20 | 0.25 | 0.40 | 150 | 1472 | 1367 | 98 |
| Example | 0.05 | 0.15 | 0.20 | 0.25 | 0.40 | 150 | 1470 | 1380 | 98 |
| Example | 0.05 | 0.19 | 0.20 | 0.25 | 0.40 | 150 | 1469 | 1362 | 98 |
| Example | 0.05 | 0.20 | 0.20 | 0.25 | 0.40 | 150 | 1468 | 1319 | 97 |
| Example | 0.05 | 0.22 | 0.20 | 0.25 | 0.40 | 171 | 1467 | 1315 | 97 |
| Example | 0.05 | 0.25 | 0.20 | 0.25 | 0.40 | 150 | 1462 | 1309 | 97 |

TABLE 4

| Example/ Comparative example | Sample No | Rare earth element: TRE mass % | Rare earth element: Nd mass % | Rare earth element: Pr mass % | Transition metal element: Co mass % | Transition metal element: Fe mass % | Boron, Carbon, Oxygen, Nitrogen: B + C mass % | B mass % | C mass % | O mass % | N mass % | M mass % |
|---|---|---|---|---|---|---|---|---|---|---|---|---|
| Example | 43 | 30.00 | 18.00 | 12.00 | 0.00 | Bal. | 1.02 | 0.95 | 0.07 | 0.06 | 0.05 | 0.65 |
| Example | 44 | 30.00 | 18.00 | 12.00 | 0.50 | Bal. | 1.02 | 0.94 | 0.08 | 0.06 | 0.05 | 0.65 |
| Example | 45 | 30.00 | 18.00 | 12.00 | 0.90 | Bal. | 1.02 | 0.94 | 0.08 | 0.05 | 0.06 | 0.65 |
| Example | 46 | 30.00 | 18.00 | 12.00 | 1.10 | Bal. | 1.02 | 0.94 | 0.08 | 0.06 | 0.06 | 0.65 |
| Example | 4 | 30.00 | 18.00 | 12.00 | 1.30 | Bal. | 1.02 | 0.94 | 0.08 | 0.05 | 0.06 | 0.65 |
| Example | 47 | 30.00 | 18.00 | 12.00 | 1.50 | Bal. | 1.01 | 0.94 | 0.07 | 0.06 | 0.05 | 0.65 |
| Example | 48 | 30.00 | 18.00 | 12.00 | 2.00 | Bal. | 1.03 | 0.95 | 0.08 | 0.05 | 0.05 | 0.65 |
| Example | 49 | 30.00 | 15.00 | 15.00 | 1.30 | Bal | 0.98 | 0.90 | 0.08 | 0.04 | 0.06 | 0.65 |
| Example | 11 | 30.00 | 15.00 | 15.00 | 1.30 | Bal. | 1.02 | 0.95 | 0.07 | 0.06 | 0.06 | 0.65 |
| Example | 4 | 30.00 | 18.00 | 12.00 | 1.30 | Bal. | 1.02 | 0.94 | 0.08 | 0.06 | 0.06 | 0.65 |
| Example | 10 | 30.00 | 21.00 | 9.00 | 1.30 | Bal. | 0.98 | 0.92 | 0.06 | 0.05 | 0.05 | 0.65 |

TABLE 4-continued

| | | | | | | | | | | | | |
|---|---|---|---|---|---|---|---|---|---|---|---|---|
| Example | 50 | 30.00 | 21.00 | 9.00 | 1.30 | Bal. | 1.05 | 0.95 | 0.10 | 0.06 | 0.06 | 0.65 |
| Example | 51 | 30.00 | 18.00 | 12.00 | 1.30 | Bal. | 0.92 | 0.90 | 0.02 | 0.12 | 0.07 | 0.65 |
| Example | 52 | 30.00 | 18.00 | 12.00 | 1.30 | Bal. | 0.93 | 0.90 | 0.03 | 0.08 | 0.07 | 0.65 |
| Example | 4 | 30.00 | 18.00 | 12.00 | 1.30 | Bal. | 1.02 | 0.94 | 0.08 | 0.06 | 0.06 | 0.65 |
| Example | 53 | 30.00 | 18.00 | 12.00 | 1.30 | Bal. | 1.07 | 0.98 | 0.09 | 0.08 | 0.06 | 0.65 |
| Example | 54 | 30.00 | 18.00 | 12.00 | 1.30 | Bal. | 1.08 | 0.99 | 0.09 | 0.07 | 0.06 | 0.65 |

| Example/ | M | | | Amount ratio | | | Magnetic properties | | |
|---|---|---|---|---|---|---|---|---|---|
| Comparative example | Al mass % | Cu mass % | Zr mass % | Ga mass % | Pr/ TRE | Pr/ C | Br mT | HcJ kA/m | Hk/HcJ % |
| Example | 0.05 | 0.15 | 0.20 | 0.25 | 0.40 | 171 | 1451 | 1311 | 97 |
| Example | 0.05 | 0.15 | 0.20 | 0.25 | 0.40 | 150 | 1455 | 1315 | 97 |
| Example | 0.05 | 0.15 | 0.20 | 0.25 | 0.40 | 150 | 1458 | 1384 | 97 |
| Example | 0.05 | 0.15 | 0.20 | 0.25 | 0.40 | 150 | 1463 | 1382 | 98 |
| Example | 0.05 | 0.15 | 0.20 | 0.25 | 0.40 | 150 | 1470 | 1380 | 98 |
| Example | 0.05 | 0.15 | 0.20 | 0.25 | 0.40 | 171 | 1472 | 1366 | 98 |
| Example | 0.05 | 0.15 | 0.20 | 0.25 | 0.40 | 150 | 1474 | 1318 | 99 |
| Example | 0.05 | 0.15 | 0.20 | 0.25 | 0.50 | 188 | 1461 | 1432 | 96 |
| Example | 0.05 | 0.15 | 0.20 | 0.25 | 0.50 | 214 | 1469 | 1385 | 97 |
| Example | 0.05 | 0.15 | 0.20 | 0.25 | 0.40 | 150 | 1470 | 1380 | 98 |
| Example | 0.05 | 0.15 | 0.20 | 0.25 | 0.30 | 150 | 1472 | 1325 | 99 |
| Example | 0.05 | 0.15 | 0.20 | 0.25 | 0.30 | 90 | 1466 | 1285 | 99 |
| Example | 0.05 | 0.15 | 0.20 | 0.25 | 0.40 | 600 | 1452 | 1364 | 95 |
| Example | 0.05 | 0.15 | 0.20 | 0.25 | 0.40 | 400 | 1460 | 1367 | 96 |
| Example | 0.05 | 0.15 | 0.20 | 0.25 | 0.40 | 150 | 1470 | 1380 | 98 |
| Example | 0.05 | 0.15 | 0.20 | 0.25 | 0.40 | 133 | 1470 | 1321 | 99 |
| Example | 0.05 | 0.15 | 0.20 | 0.25 | 0.40 | 133 | 1471 | 1281 | 99 |

TABLE 5

| Example/ | | Rare earth element | | | | RH | Transition metal element | | Boron, Carbon, Oxygen, Nitrogen | | | |
|---|---|---|---|---|---|---|---|---|---|---|---|---|
| Comparative example | Sample No | TRE mass % | Nd mass % | Pr mass % | RH type | amout mass % | Co mass % | Fe mass % | B + C mass % | B mass % | C mass % | O mass % |
| Example | 4 | 30.00 | 18.00 | 12.00 | None | 0.00 | 1.30 | Bal. | 1.02 | 0.94 | 0.08 | 0.06 |
| Example | 55 | 30.00 | 17.80 | 12.00 | Dy | 0.20 | 1.30 | Bal. | 1.01 | 0.94 | 0.07 | 0.05 |
| Comparative example | 56 | 30.00 | 17.60 | 12.00 | Dy | 0.40 | 1.30 | Bal. | 1.01 | 0.94 | 0.07 | 0.06 |
| Example | 57 | 30.00 | 17.80 | 12.00 | Tb | 0.20 | 1.30 | Bal. | 1.01 | 0.94 | 0.07 | 0.06 |
| Comparative example | 58 | 30.00 | 17.60 | 12.00 | Tb | 0.40 | 1.30 | Bal. | 1.03 | 0.95 | 0.08 | 0.05 |
| Example | 59 | 30.00 | 17.80 | 12.00 | Ho | 0.20 | 1.30 | Bal | 1.01 | 0.94 | 0.07 | 0.05 |
| Comparative example | 60 | 30.00 | 17.60 | 12.00 | Ho | 0.40 | 1.30 | Bal. | 1.01 | 0.94 | 0.07 | 0.06 |

| Example/ | Boron, Carbon, Oxygen, Nitrogen | | M | | | Amount ratio | | | Magnetic properties | | |
|---|---|---|---|---|---|---|---|---|---|---|---|
| Comparative example | N mass % | M mass % | Al mass % | Cu mass % | Zr mass % | Ga mass % | Pr/ TRE | Pr/ C | Br mT | HcJ kA/m | Hk/ HcJ % |
| Example | 0.06 | 0.65 | 0.05 | 0.15 | 0.20 | 0.25 | 0.40 | 150 | 1470 | 1380 | 98 |
| Example | 0.06 | 0.65 | 0.05 | 0.15 | 0.20 | 0.25 | 0.40 | 170 | 1465 | 1395 | 97 |
| Comparative example | 0.05 | 0.65 | 0.05 | 0.15 | 0.20 | 0.25 | 0.40 | 169 | 1446 | 1412 | 97 |
| Example | 0.06 | 0.65 | 0.05 | 0.15 | 0.20 | 0.25 | 0.40 | 170 | 1463 | 1404 | 97 |
| Comparative example | 0.05 | 0.65 | 0.05 | 0.15 | 0.20 | 0.25 | 0.40 | 148 | 1439 | 1423 | 97 |
| Example | 0.05 | 0.65 | 0.05 | 0.15 | 0.20 | 0.25 | 0.40 | 170 | 1466 | 1385 | 98 |
| Comparative example | 0.05 | 0.65 | 0.05 | 0.15 | 0.20 | 0.25 | 0.40 | 169 | 1442 | 1395 | 97 |

Table 1 shows the examples and the comparative examples in which TRE and Pr/TRE were mainly changed. The examples having TRE within a range of 29.00 mass % or larger and 31.00 mass % or less and Pr/TRE within a range of 0.30 or larger and 0.50 or less exhibited good magnetic properties. The examples having TRE within a range of 30.00 mass % or larger and 31.00 mass % or less and Pr/TRE within a range of 0.40 or larger and 0.50 or less exhibited good magnetic properties, particularly of HcJ. On the contrary to this, HcJ decreased in the comparative examples in which TRE was too small and Pr/TRE was too small. Regarding the comparative examples in which TRE was too large, Br decreased. Regarding the comparative examples in which Pr/TRE was too large, Hk/HcJ decreased.

Table 2 shows the examples and the comparative examples in which the amount of B, the amount of C, and the amount of O were mainly changed. The examples having the amounts of all of the elements within the predetermined ranges exhibited good magnetic properties. The examples in which the amount of B was 0.95 mass % or less, the amount of C was 0.09 mass % or less, and the amount of O was within a range of 0.04 mass % or more and 0.10 mass % or less exhibited good magnetic properties, particularly of HcJ. On the contrary to this, regarding the comparative examples in which the amount of B was too small, Hk/HcJ decreased. Regarding the comparative examples in which the amount of B was too large, HcJ decreased. Regarding the comparative examples in which the amount of C was too large, HcJ decreased. Regarding the comparative examples in which the amount of O was too large, HcJ decreased.

Table 3 shows examples and comparative examples in which the amount of M and the amount of Cu were mainly changed. The examples having the amounts of all of the elements within the predetermined ranges exhibited good magnetic properties. On the contrary to this, regarding the comparative examples in which the amount of M was too small, HcJ decreased. Regarding the comparative examples in which the amount of M was too large, Br decreased.

Also, the examples having the amount of M within the range of 0.50 mass % or more and 1.00 mass % or less exhibited improved HcJ compared to the examples having less than 0.50 mass % of the amount of M. The examples in which the amount of M was within the range of 0.50 mass % or more and 1.00 mass % or less exhibited improved Br compared to the examples in which the amount of M was larger than 1.00 mass %.

The examples in which the amount of M was within a range of 0.50 mass % or more and 1.00 mass % or less and the amount of Cu was within a range of 0 mass % or more and 0.19 mass % or less exhibited particularly improved HcJ compared to the examples in which the amount of M was within a range of 0.50 mass % or more and 1.00 mass % or less and the amount of Cu was larger than 0.19 mass %.

Further, the examples in which the amount of M was within a range of 0.65 mass % or more and 1.00 mass % or less and the amount of Cu was within a range of 0.05 mass % or more and 0.20 mass % or less exhibited particularly improved HcJ compared to other examples.

The examples in which the amount of M was larger than 1.00 mass % and the amount of Cu was within a range of 0 mass % or more and 0.20 mass % or less exhibited particularly improved HcJ compared to the examples in which the amount of M was larger than 1.00 mass % and the amount of Cu was larger than 0.20 mass %.

Table 4 shows the example in which the amount of Co, Pr/C, or B+C was changed. The examples having the amounts of all of the elements within the predetermined ranges exhibited good magnetic properties. Particularly, the magnetic properties were even more improved when the amount of Co was within a range of 1.10 mass % or more and 1.50 mass % or less, Pr/C was within a range of 100 or larger and 400 or less, and B+C were within a range of 0.93 or larger and 1.07 or less.

Table 5 shows examples and comparative examples in which a type and an amount of RH were mainly changed. The examples having the amounts of all of the elements within the predetermined ranges exhibited good magnetic properties. On the contrary to this, regarding the comparative examples in which the amount of RH was too large, lowered Br decreased.

What is claimed is:

1. An R-T-B based permanent magnet, comprising: rare earth elements, transition metal elements, boron, and M; wherein the rare earth elements at least include Nd and Pr, the transition metal elements at least include Fe and Co, M includes one or more selected from the group consisting of Al, Cu, Ga, and Zr, an amount of a heavy rare earth element is within a range between 0 mass % or more and 0.20 mass % or less, an amount of cobalt is within a range between 1.10 mass % or more and 1.50 mass % or less, an amount of boron is within a range between 0.90 mass % or more and 1.00 mass % or less, an amount of carbon is within a range between 0 mass % or more and 0.10 mass % or less, an amount of oxygen is within a range between 0 mass % or more and 0.15 mass % or less, an amount of nitrogen is within a range between 0 mass % or more and 0.15 mass % or less, an amount of M is within a range between 0.30 mass % or more and 1.50 mass % or less, an amount of the rare earth elements based on mass represented by TRE is within a range between 29.00 mass % or more and 31.00 mass % or less, and a value represented by Pr/TRE which is obtained by dividing Pr based on mass by TRE is within a range between 0.30 or larger and 0.50 or smaller.

2. The R-T-B based permanent magnet according to claim 1, wherein

Pr/C is 100 or larger in which Pr/C represents a value obtained by dividing the amount of Pr based on mass by the amount of carbon based on mass.

3. The R-T-B based permanent magnet according to claim 1, wherein an amount of Cu is within a range between 0 mass % or more and 0.20 mass % or less.

4. The R-T-B based permanent magnet according to claim 1, wherein a total amount of boron and carbon is within a range between 0.93 mass % or more and 1.07 mass % or less.

5. The R-T-B based permanent magnet according to claim 1, wherein the amount of M is within a range between 0.50 mass % or more and 1.00 mass % or less.

6. The R-T-B based permanent magnet according to claim 1, wherein Pr/C is 120 or larger in which Pr/C represents a value obtained by dividing the amount of Pr based on mass by the amount of carbon based on mass.

7. The R-T-B based permanent magnet according to claim 1, wherein Pr/C is 120 or larger and 600 or smaller in which Pr/C represents a value obtained by dividing the amount of Pr based on mass by the amount of carbon based on mass.

8. The R-T-B based permanent magnet according to claim 1, wherein an amount of Cu is within a range between 0.05 mass % or more and 0.20 mass % or less.

9. The R-T-B based permanent magnet according to claim 1, wherein the amount of boron is within a range between 0.95 mass % or more and 1.00 mass % or less.

10. The R-T-B based permanent magnet according to claim 1, wherein a total amount of boron and carbon is within a range between 0.93 mass % or more and 1.02 mass % or less.

11. The R-T-B based permanent magnet according to claim 1, wherein the amount of M is within a range between 0.65 mass % or more and 1.00 mass % or less.

12. An R-T-B based permanent magnet, comprising: rare earth elements, transition metal elements, boron, and M; wherein the rare earth elements at least include Nd and Pr, the transition metal elements at least include Fe or a combination of Fe and Co, M includes one or more selected from the group consisting of Al, Cu, Ga, and Zr, an amount of a heavy rare earth element is within a range between 0 mass % or more and 0.20 mass % or less, an amount of boron is within a range between 0.90 mass % or more and 1.00 mass % or less, an amount of carbon is within a range between 0.02 mass % or more and 0.10 mass % or less, an amount of oxygen is within a range between 0 mass % or more and 0.15 mass % or less, an amount of nitrogen is within a range between 0 mass % or more and 0.15 mass % or less, an amount of M is within a range between 0.30 mass % or more and 1.50 mass % or less, an amount of the rare earth elements based on mass represented by TRE is within a range between 29.00 mass % or more and 31.00 mass % or less, a value represented by Pr/TRE which is obtained by dividing Pr based on mass by TRE is within a range between 0.30 or larger and 0.50 or smaller, and Pr/C is 120 or larger and 600 or smaller in which Pr/C represents a value obtained by dividing the amount of Pr based on mass by the amount of carbon based on mass.

13. The R-T-B based permanent magnet according to claim 12, wherein an amount of Cu is within a range between 0 mass % or more and 0.20 mass % or less.

14. The R-T-B based permanent magnet according to claim 12, wherein a total amount of boron and carbon is within a range between 0.93 mass % or more and 1.07 mass % or less.

15. The R-T-B based permanent magnet according to claim 12, wherein the amount of M is within a range between 0.50 mass % or more and 1.00 mass % or less.

16. The R-T-B based permanent magnet according to claim 12, wherein an amount of Cu is within a range between 0.05 mass % or more and 0.20 mass % or less.

17. The R-T-B based permanent magnet according to claim 12, wherein the amount of boron is within a range between 0.95 mass % or more and 1.00 mass % or less.

18. The R-T-B based permanent magnet according to claim 12, wherein a total amount of boron and carbon is within a range between 0.93 mass % or more and 1.02 mass % or less.

19. The R-T-B based permanent magnet according to claim 12, wherein the amount of M is within a range between 0.65 mass % or more and 1.00 mass % or less.

* * * * *